INVENTORS
ELLISON S. PURINGTON
EMORY LEON CHAFFEE
BY [signature]
ATTORNEY

INVENTORS
ELLISON S. PURINGTON
EMORY LEON CHAFFEE
BY
ATTORNEY

March 26, 1968 E. S. PURINGTON ETAL 3,375,328

RECEIVER FOR PHASE SHIFT COMMUNICATION SYSTEM

Filed July 5, 1960 5 Sheets-Sheet 3

INVENTORS
ELLISON S. PURINGTON
EMORY LEON CHAFFEE

BY

ATTORNEY

RECEIVER FOR PHASE SHIFT COMMUNICATION SYSTEM

Filed July 5, 1960

5 Sheets-Sheet 4

INVENTORS
ELLISON S. PURINGTON
EMORY LEON CHAFFEE

BY *[signature]*

ATTORNEY

INVENTORS
ELLISON S. PURINGTON
EMORY LEON CHAFFEE

BY [signature]

ATTORNEY

United States Patent Office 3,375,328

Patented Mar. 26, 1968

3,375,328

RECEIVER FOR PHASE SHIFT COMMUNICATION SYSTEM

Ellison S. Purington, Gloucester, and Emory Leon Chaffee, Belmont, Mass., assignors to Ralph G. Lucas, Nathaniel L. Leek, and The National Shawmut Bank, executors of last will of John H. Hammond, Jr., deceased Filed July 5, 1960, Ser. No. 40,639

6 Claims. (Cl. 178—88)

This invention relates to radio telegraphic communication by keyed phase shift of a radio carrier.

In accordance with the present invention the transmitter consists of means for producing a 90-degree phase shift of the carrier when the key is depressed by shifting the phase of the input voltage to the power amplifiers in three progressive steps while maintaining the input voltage constant in magnitude.

The receiver includes means for producing an error signal for controlling the heterodyne frequencies, so as to maintain the proper phase relations between the signal frequency and the two heterodyne frequencies, which is active not only for the key-up condition but also for the key-down condition. This improvement provides a continuous phase lock of the heterodynes irrespective of the phase of the signal carrier wave.

The receiver also embodies an improved phase-modulation circuit for controlling the phase of an oscillator by a balanced error signal so as to maintain the phase relations of the two heterodynes proper for operation of the communication system.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which FIG. 1 is a schematic diagram of an improved type of circuit for the input end of the transmitter;

Like reference characters denote like parts in the several figures of the drawing.

In the following description parts will be identified by specific names for convenience, but they are intended to be generic in their application to similar parts.

Figure 1:
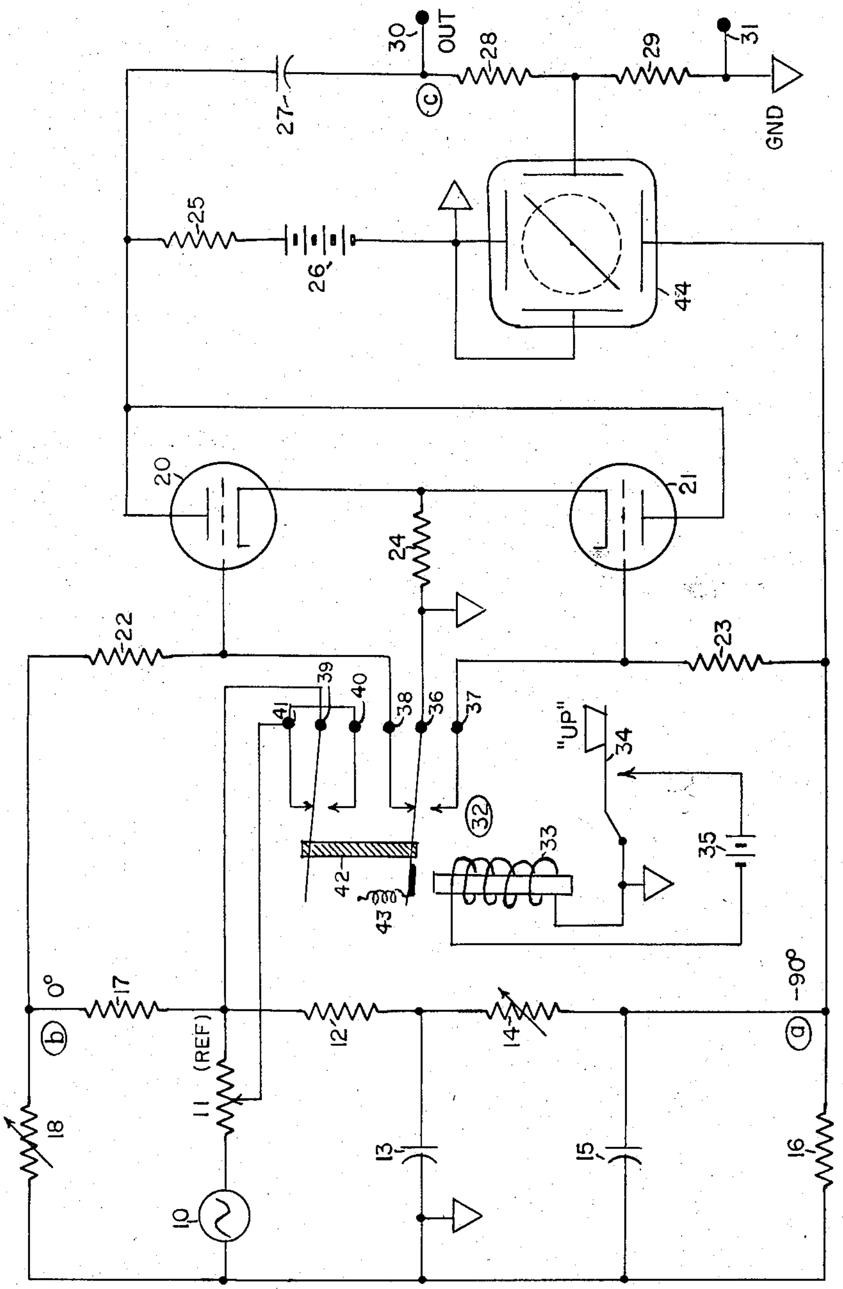

In FIG. 1, the carrier frequency voltage is represented by circle 10, and it is preferably produced by an oscillator of high stability as to frequency. By use of elements 11 to 16 inclusive, constituting an RC low-pass phase-retarding network, the voltage to ground at point *a* at the common junction of elements 14, 15 and 16 is made to lag 90° behind the voltage to ground at the zero reference point Ref. at the junction of elements 11 and 12. Because, however, the strength of the voltage at point *a* is less than at point Ref., further elements 17 and 18 are used to provide at their common junction point *b* a voltage to ground of the same magnitude as that for point *a*. Precise equality of voltage amplitude and quadrature of phase for the two points *a* and *b* can be achieved by adjustment of elements such as the variable resistors 18 and 14. Two like triodes 20 and 21 are provided, with the grid of triode 20 driven from point *b* through resistor 22, and the grid of triode 21 driven from point *a* through resistor 23. The cathodes of triodes 20 and 21 are connected together and through cathode-bias resistor 24 to ground. The plates are also connected together and connected to ground through plate resistor 25 and B-battery 26. The plates are also connected through capacitor 27, resistor 28, and resistor 29 to ground. Terminal 30, at the junction of elements 27 and 28, is the "hot" output terminal and terminal 31, connected to ground, is the "cold" output terminal. It is to be understood that these output terminals are connected to power amplifiers and antenna circuits, not shown, to radiate energy with the same characteristics that exist at these terminals 30–31. By grounding the grid of tube 20, this tube is rendered inoperative so that the signal on the grid of tube 21 alone is repeated to actuate the output terminals. Or by grounding the grid of tube 21, the tube 20 alone is active. To accomplish these groundings to form messages, a double-pole double-throw relay 32 is used, the winding 33 of which is energized by depressing a key 34 to control the flow of current from battery 35. The leaf 36 of the first output section of the relay is connected to ground, while the front contact spring 37 and the back contact spring 38 are connected to the grids of tubes 21 and 20, respectively. For the second output section, the leaf 39 is connected to the common junction of elements 11, 12 and 17 termed Ref., and the contact springs 40 and 41 are connected together and to the variable tap on resistor 11. The leaves 36 and 39 are joined mechanically by insulating bar 42, and they are normally held back against the contacts of springs 38 and 41 by spring 43.

In operation, for the key-up position as shown, tube 20 has its grid grounded but tube 21 is driven from point *a* at −90° phase. When, however, the key is depressed to the down position, the grid of tube 21 is grounded and tube 20 is driven from point *b* of zero phase. Therefore depressing the key advances the phase of the voltage that is effective in driving the paralleled tubes 20 and 21, and therefore advances the phase of the output voltage across terminals 30 and 31. By the adjustments provided, the phase change may be precisely 90° without change of amplitude. However, when the key is in the process of being depressed, and leaf 36 is not in contact with either spring 37 or 38 the grids of both tubes 20 and 21 are actuated and the output phase is intermediate between the phases for key-up and key-down conditions. Moreover, the amplitude of the output in the transitional period would normally be greater than for the end conditions since both tubes 20 and 21 are driven at 90° phase difference. However, a part of resistor 11 is shorted out by the second relay output section when leaf 39 is in contact with either spring 40 or spring 41, but there is no shorting when the leaf 39 is not in contact with either spring. As a result, the voltage of point Ref. with respect to ground is greater for both key-up and key-down conditions than for the transitional condition. Thus by suitable adjustments of the three elements 14, 18, and 11, depressing the key 34 results in exact quadrature shift of output from key-up to key-down conditions, with exact equality of signal strength for the transitional period with the signal strengths at the ends of the key operation. To assist in adjusting and monitoring the performance of the circuit, a scope, symbolized by block 44, may have one pair of plates connected to the key-up drive point *a* and ground and the other pair connected to the junction of resistors 28 and 29 bridged across the output terminals and ground. The trace is made to be a straight line with 45° slope for the key-up condition and a circle for the key-down condition. Momentarily it is an ellipse for the transient condition.

It is understood that the choices of suitable constants for circuit elements can be made by those skilled in the art as for example in the design of the delay network and in choosing the values of resistors 22 and 23 sufficiently high with respect to those of the network resistors so that the performance will not be seriously altered by the grounding of one of the grids of tubes 20 and 21.

Figure 2:
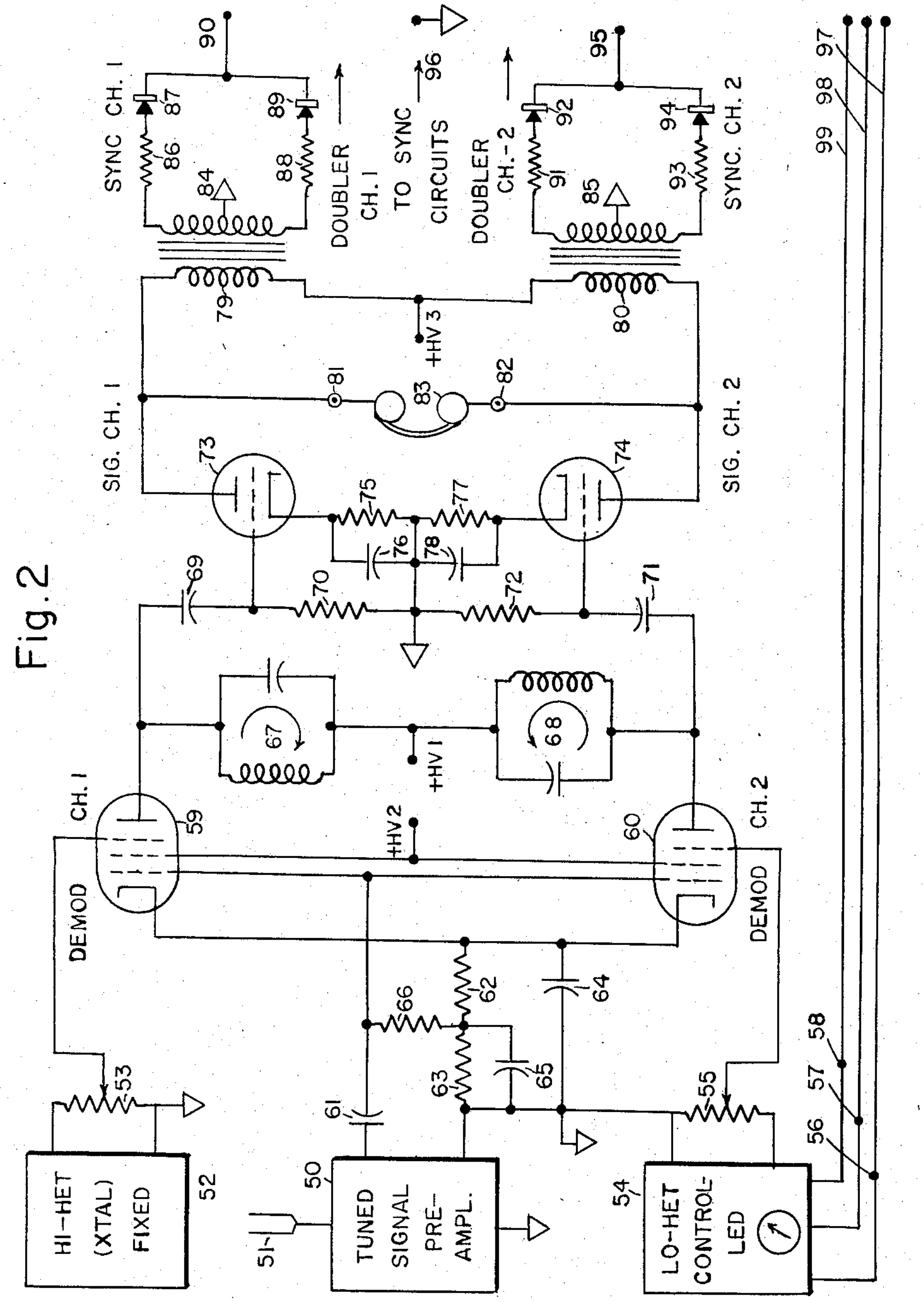
FIG. 2 is a schematic diagram showing an improved circuit for the input end of the receiver.

Referring to FIG. 2, representing the front end and signal circuits of the receiver, a tuned signal preamplifier 50 driven from antenna 51 is provided of suitable sharpness with relation to the keying speed and of suitable freedom from overload with relation to the interferences that may be expected. A heterodyne, 52, having a frequency higher than carrier frequency, is provided with an output volume control 53. A second heterodyne 54, having a frequency lower than carrier frequency, is provided with an output volume control 55. The heterodyne 52 may be based upon crystal oscillator design, while the heterodyne 54 may be a high grade LC type oscillator provided for voltage control of frequency by error signals fed to it at terminals 56, 57, and 58. Manual control of the free running oscillation frequency for zero error signals is provided, supplemented by automatic control if desired by devices, not shown. Circuitries and adjustments must be provided so that the difference of the high-heterodyne and carrier will be matched by the difference between the carrier and low-heterodyne frequencies, with very slow drift which is correctable. Demodulator pentodes 59 and 60 are provided, with the third or suppressor grids connected to the movable taps of the volume controls 53 and 55, respectively, these grids being biased at ground DC potential because of the grounding of one end of the volume controls. The signal preamplifier output from block 50 is connected through capacitor 61 to the first or control grids of both pentodes. The cathodes of the pentodes are connected together and through biasing resistors 62 and 63 to ground. The cathodes are bypassed to ground by capacitor 64, and the junction of resistors 62 and 63 is connected to ground for AC purposes by capacitor 65. The junction between resistors 62 and 63 is the return point for the control grids of tubes 59 and 60, to which return point the grids are connected by resistor 66. The plates of the pentodes 59 and 60 are connected through tuned circuits 67 and 68 to high voltage source HV1, and the screen grids are connected to high voltage source HV2 preferably of lower potential than HV1. These pentodes serve as heterodyne-type demodulators with output circuits tuned to the differences of the frequencies impressed upon the first and third grids. In the present case the tuned circuits are of the same nominal frequency, and are of identical construction of suitable band width for the desired key rate. The strengths of the oscillations in the two tuned circuits can be made equal by adjustments of the heterodyne volume controls 53 and 55.

The adjustments of the low-heterodyne circuit, either manual, automatic, or a combination of the two, are to be made such that for the key-up condition, the plate voltages of the pentodes are in phase, and therefore out of phase for the key-down condition. This 180° shift of the relative phases of the two demodulator outputs is because the 90° shift of the signal changes the phases of the two demodulated outputs by 90° in opposite senses. To keep the pentodes at low signal level so that the signal values will not be disturbed by noises in the circuits entering by the antenna, and so that the width of the resonance curves of the tuned circuits will not be seriously broadened by taking off a tone signal, the plates of the pentodes are coupled by elements 69–72 to the grids of amplifying triodes 73 and 74 provided with the usual bias by elements 75–78. The plates of these triodes are connected through primary windings 79 and 80 of suitable transformers to the high voltage point HV3, and are also connected to jacks 81 and 82 into which may be plugged the headphones 83. As an alternative to these headphones, a signal-operated relay system may be used to drive a local-oscillator signal-indicator system, preferably of the type that is self-adjusting as to bias in accordance with the amount of non-signal noise voltages to give improved signal-to-noise ratio. Such a system is not a part of the present invention and is not here described in detail. As here connected, with the key up and the voltages of the plates of triode 73 and 84 in phase and of equal magnitude, there will be no voltage between jacks 81 and 82 and therefore no output signal. But with the key down, the plates of 73 and 84 become oppositely phased to produce a signal due to the conjoint action of both channels. The output transformers with primaries 79 and 80 in the signal channels are not for direct signal purposes, but are used to feed secondary circuits and later circuitries to maintain the voltages of the plates of 73 and 74 to be in phase for the key-up condition, once this condition has been initially established.

The secondary windings 84 and 85 for the transformers with primary windings 79 and 80 have their terminals connected through resistors and crystal diodes 86–87, 88–89, 91–92, 93–94, to terminals 90 and 95, and the centers of the secondaries are grounded and connected to terminal 96. The diodes may be electronic if desired, and they are connected with their cathodes at the terminals 90 and 95. This arrangement produces a wave form strong in voltage of double the frequency of the wave which drives the transformer primaries. If the relative phase of the voltages across the two primary windings changes by 180° as by changing of the transmitter key in either direction, then the relative phase of the two double-frequency voltages at terminals 90 and 95 does not change. In other words, keying produces a double-frequency voltage shift of 180° at terminal 90 and also a double-frequency voltage shift of 180° in the opposite sense at terminal 95. The relative shift of phase at the terminals 90 and 95 therefore is 360° in one sense or the other corresponding to no change of the relative wave form. There may, of course, be phase shifts in the transformer systems, but by symmetry the change in one sync channel will be the same as in the other sync channel. As a result, if the relative phase of the plates of pentodes 59 and 60 is the normal zero for key-up or the normal 180° for the key-down condition, then the relative phase of the double-frequency components of voltage at points 90 and 95 will be zero, for both key conditions. But if the relative phase of the pentode plates is in error by say 10° in a given sense, then the relative phase of the points 90 and 95 will be in error by twice as much, say 20° in that same sense.

In FIG. 2, lines 97, 98, and 99 are connected to the control terminals 56, 57, and 58, respectively, of the lower frequency heterodyne. Line 98 is grounded, and the voltages of lines 97 and 99 are made to change in opposite senses in a balanced or push-pull manner in accordance with fluctuations of the relative phase of point 90 with respect to point 95. In other words, the balanced error signals or voltages on the feed-back cable 97, 98, 99 change in step with changes of departure of the phase of 90 with respect to 95. The erorr signal operates to speed up or slow down the phase of the heterodyne voltage output to the third grid of pentode 60 in a sense tending to restore points 90 and 95 to phase equality.

Figure 3:
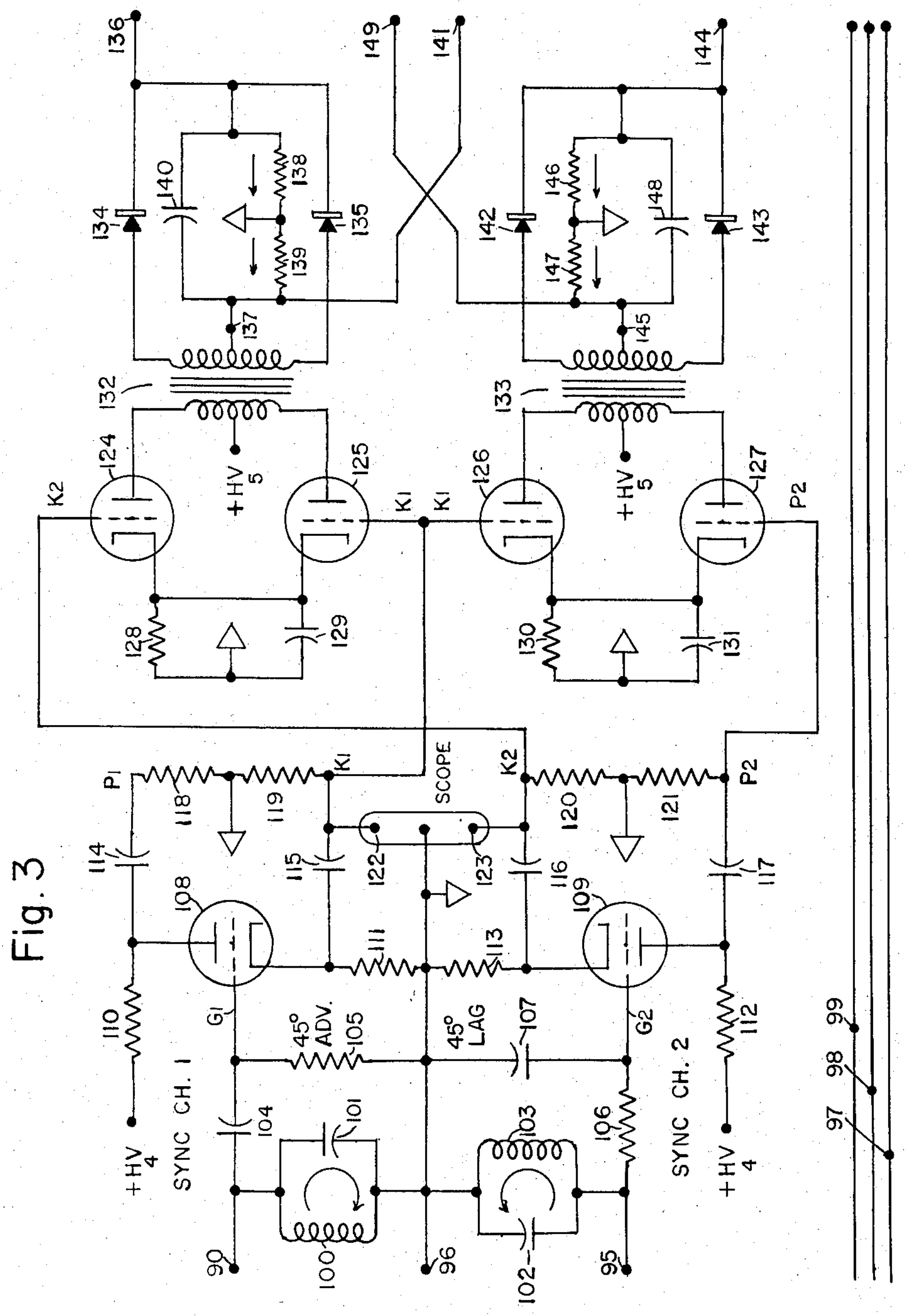
FIG. 3 is a schematic circuit diagram for the formation of a synchronizing voltage from the signal voltages.

Refer now to FIG. 3, showing important steps in the production of the error signal or voltage for lines 97, 98, and 99. Passing through the figure, the first step is to purify the double frequency voltage. The second step recognizes that it is much more practicable to maintain two voltages to be in phase quadrature than to maintain them in the same phase. Therefore by elements 100, 101, 104, and 105 the voltage of point 90 to ground is purged of other than double frequency components and the phase of junction point G1, between elements 104 and 105, is advanced in phase with respect to point 90 by 45°. Similarly elements 102, 103, 106, and 107 purifies the double-frequency voltage at point 95 and causes point G2 to lag 45° behind point 95. These elements can be chosen by those skilled in the art to give suitable selectivity, and to cause points G1 and G2 to have the same magnitude of voltage when points 90 and 95 have the same magnitude of voltage.

The system operates upon the principle that if the vector sum and the vector difference of two voltages are equal in magnitude, then those two voltages must be quadrature related. Like triodes 108 and 109 are used as phase inverters, with plate and cathode resistors 110 and 111 for triode 108 equal to each other and to the corresponding plate and cathode resistors 112 and 113 for triode 109. Phase advanced point G1 is connected to the grid of triode 108 and phase retarded point G2 is connected to the grid of triode 109. As an alternative, a phase inverter system could be used with the grid return to a tap on a cathode resistor, but the present arrangement is shown for simplicity. Plate and cathode output capacitors and resistors 114 to 121 inclusive are used to furnish outputs of the two sync channels at points P1, K1, K2 and P2 as indicated, with P1 and K1 having substantially equal and opposite voltages to ground with K1 of the same phase as point G1. Similarly, P2 and K2 have equal and oppositely phased voltages to ground with K2 of the same phase as point G2. Points K1 and K2 co-phased with points G1 and G2, respectively, may be connected to jacks 122 and 123, which may be connected to the vertical and horizontal plates of a scope. Under correct operating conditions, the scope trace will be a circle with the spot travelling around in the same direction for both the key-up and the key-down condition, with the voltages of the headphone jacks either in phase or out of phase. If through gradual drift of the frequency of either heterodyne or of the signal source the voltage of point K1 leads that of K2 by more than 90° then the later circuits to be described produce balanced error signals applied to the lower frequency heterodyne 54 to bring back the phase difference toward 90°. Conversely if the voltage of point K1 leads that of K2 by less than 90°, then error signals are produced to bring forward the phase difference toward 90°. The variable manual frequency control for the low heterodyne may be adjusted from time to time on a long period basis, either manually or semi-automatically, to keep the "free-running" frequency of the heterodyne substantially correct for the condition of no error signal. That is, the manual control must be kept substantially centered in the range of values throughout which the error voltage can hold the system in synchronism.

The later circuits referred to above begin in FIG. 3 and include a pair of mixing amplifiers and output rectifiers. The first mixer uses triodes 124 and 125, and the second uses triodes 126 and 127. These are Class A amplifiers biased by elements 128 to 131 from cathodes to ground. Each mixer has an output transformer with center tapped primary and secondary. The first mixer has its two grids driven from points K1 and K2 of the same electrical phases as points G1 and G2. Since the connections are such that no secondary output results when the grids are driven in phase, this mixer plays the role of subtractor, since its combined output is proportional to the vector difference of the voltages at G1 and G2. The second mixer has its two grids driven from points K1 and P2. Since K1 is an electrical phase with G1 but P2 is out of phase with G2, and the output is a maximum when G1 and G2 are in electrical phase, this mixer plays the role of adder.

The rectifier systems driven by the transformer secondaries produce rectified or DC currents of magnitudes proportional to the vector difference and the vector sum, respectively, of the voltages at G1 and G2. These rectifier circuits are constructed to give both positive and negative voltages for the purpose of developing a balanced-type error signal. The rectifier circuit for the secondary of the different transformer 132 comprises crystal or electronic diodes 134 and 135 with their anodes connected to the ends of the secondary windings of transformer 132, and their cathodes connected together and to terminal 136. Bridged between the terminal 136 and the center tap 137 of the transformer is resistor 138 and resistor 139 in series, paralleled by rectifier smoothing capacitor 140. The resistors 138 and 139 are of equal resistance values, and their junction is grounded. Since the DC average of the rectified current passes through these resistors in series, the output terminal 136 is as positive with respect to ground as the output terminal 141 connected to the center tap 137 is negative with respect to ground. The rectifier circuit for the secondary of the sum transformer 133 is of like construction to that for the difference transformer, with corresponding parts numbered eight integers higher, making output terminal 144 as positive with respect to ground as terminal 149 is negative. It is to be noted that electrical phase of the voltages driving the rectifiers are not of interest. When point G1 leads point G2 in electrical phase by 90 electrical degrees, the balanced DC ouput voltages from terminals 136 and 141 to ground will equal those from terminals 144 and 149 to ground. If the phase difference between the voltages at points G1 and G2 is greater than 90°, say 110°, then the grids of triodes 124 and 125 are driven more nearly in phase opposition to increase the DC rectified outputs; at the same time the grids of triodes 126 and 127 are driven more nearly in phase to decrease its rectified outputs. If however the phase difference between the voltages at points G1 and G2 is less than 90°, say 70°, the opposite result holds that the rectified outputs of transformer 133 is greater than those for transformer 132.

Error signals indicative of the departure of the voltages of the grid points G1 and G2 from 90° can therefore be established by comparing the rectified output voltages to ground from terminals 136, 141, 144, and 149. This is best done by establishing the mean potentials of positive point 136 and negative point 149, and also the mean potentials of negative point 141 and positive point 144. This constitutes a cross channelling of DC outputs of rectifiers driven after cross channelling of AC inputs of the rectifier driving amplifiers.

Figure 4:
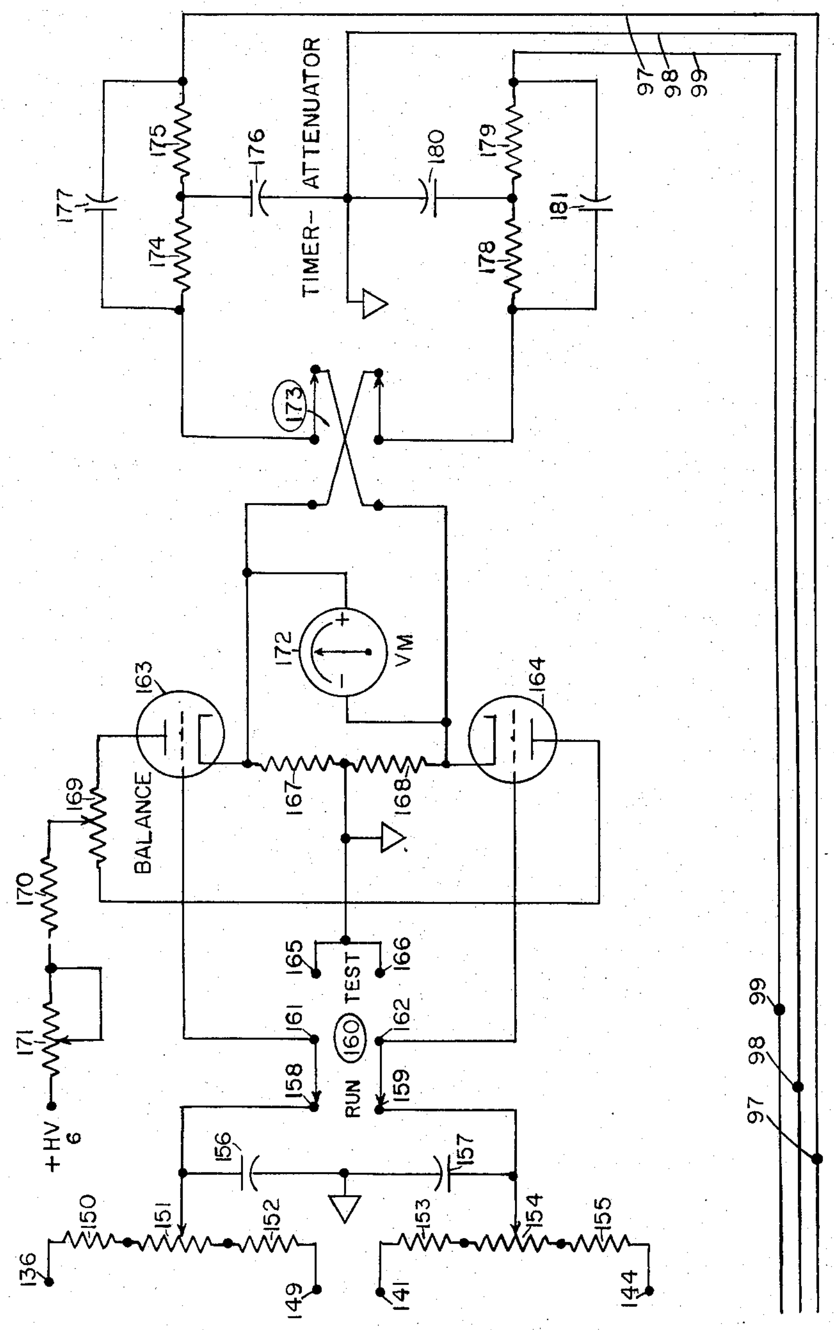
FIG. 4 is a schematic circuit diagram which relates especially to the development of the error voltage for controlling the phase-frequency of a heterodyne oscillator.

Referring now to FIG. 4, bridged from terminal 136 to 149 are resistors 150, 151, and 152, the first and third being of like resistance values relatively high with respect to those of resistors 138 and 147 of FIG. 3. Also bridged from terminals 141 to 144 are resistors 153, 154, and 155 with the first and third of equal resistance value and similarly high, and preferably of the same values as resistors 150 and 152. The middle resistors 151 and 154 preferably have variable taps, connected to ground through smoothing capacitors 156 and 157, and also connected to the terminals 158 and 159 of a double-pole double-throw switch 160. The center terminals 161 and 162 of switch 160 are connected to the grids of two triodes 163 and 164, and the other pair of end terminals 165 and 166 are connected together and to ground. The triodes 163 and 164 are for converting the error signals from a high to a low resistance level, and have output resistors 167 and 168 connected from their cathodes to ground. A tapped resistor 169 is bridged between the two plates of the triodes, and the variable tap is connected through fixed resistor 170 and rheostat 171 to a suitable high voltage point HV6. A center-zero type DC voltmeter is connected between the cathodes of the triodes for indicating the sense and magnitudes of the error signals at the cathodes. The cathodes are also connected to a double-pole double-throw switch 173 connected as a reversing switch with cross-overs. One center terminal of the switch is connected through equal resistors 174 and 175 to the error voltage or error signal feedback line 97. A capacitor 176 is connected between the junction of these resistors and ground, and a capacitor 177 is connected across the two in series. Similarly the other center terminal of switch 173 is connected to feedback line 99 through a network comprising elements 178–181. The line 98 is connected to ground.

In operation, the switch 160 is first thrown to the right to ground the grids of the triodes 163 and 164. The tubes are then balanced by adjustment of the tap of resistor 169, and the cathodes are brought to equal and correct DC voltages by further use of rheostat 171. This balance is indicated by a zero reading of voltmeter 172. The switch 160 is then thrown to the left to the running position, and with the input antenna 61 of the receiver grounded or the input resistor 66 of the demodulators shorted, the taps of resistors 151 and 154 are adjusted so that the cathode voltages are the same as previously. This procedure makes the taps on resistors 151 and 154 at ground potential for no-signal condition. But with the signal turned on, the voltmeter 172 serves to indicate the condition of synchronization. Whenever the difference-circuit rectified output between terminals 136 and 141 is greater than the sum-circuit rectified output between terminals 144 and 149, the point 136 is more positive than point 149 is negative. Consequently the tap on resistor 151 at the means of the voltages of points 136 and 149 is positive with respect to ground and the cathode resistor 167 passes more current than is proper for the desired phase relations in the receiver. Correspondingly the tap on resistor 154 is negative with respect to ground and the cathode resistor passes less current than is proper. Consequently the meter 172 reads positively and a positive error signal is sent through the switch 173 and the timer attenuator circuit comprising elements 174 to 181 to change the phase relations in a manner to reduce the error signal voltage. The opposite effect is produced and a negative error signal voltage developed if the sum circuit rectified output is greater than the difference rectified output, also tending to bring the error signal towards zero. The manual control of the low-heterodyne 54 is adjusted until the meter pointer comes to rest, indicating locking with the plates of the demodulators and the jack points 81 and 82 operating at the same frequency. Continued adjustment of the manual control of heterodyne 54 brings the system into frequency lock with zero error as to phase, corresponding to zero reading of the meter 172, phase quadrature of the scope terminal voltages at points 122 and 123, and phase equality of the voltages at the signal points 81 and 82; it being understood of course that the transmitter key is in the up-condition, and that the switch 173 is suitably thrown so that the sense of the feedback voltage meets the requirements of the control system for the heterodyne 54.

The error feedback system described will keep the system in synchronism for a considerable range of "free running" frequencies of the variable heterodyne. In place of manual control, in case the drift becomes excessive after a continued period of operation, it is possible to use a further automatic control. In addition to the use of the voltage difference of the two cathodes, triodes 163 and 164, to correct through feedback line 97, 98, 99, it is possible to use this error voltage to control the setting of a variable capacitor of the heterodyne oscillator system to reduce further the need of manual adjustment. This would use, for example, a sensitive DC motor with fixed permanent magnetic field and an armature operating from an amplifier driven from the cathodes of triodes 163 and 164 and geared to turn the variable capacitor in a proper direction. With a signal and heterodyne oscillators of high quality, the added refinement of an electro-mechanical feedback control is not an operational necessity.

Figure 5:
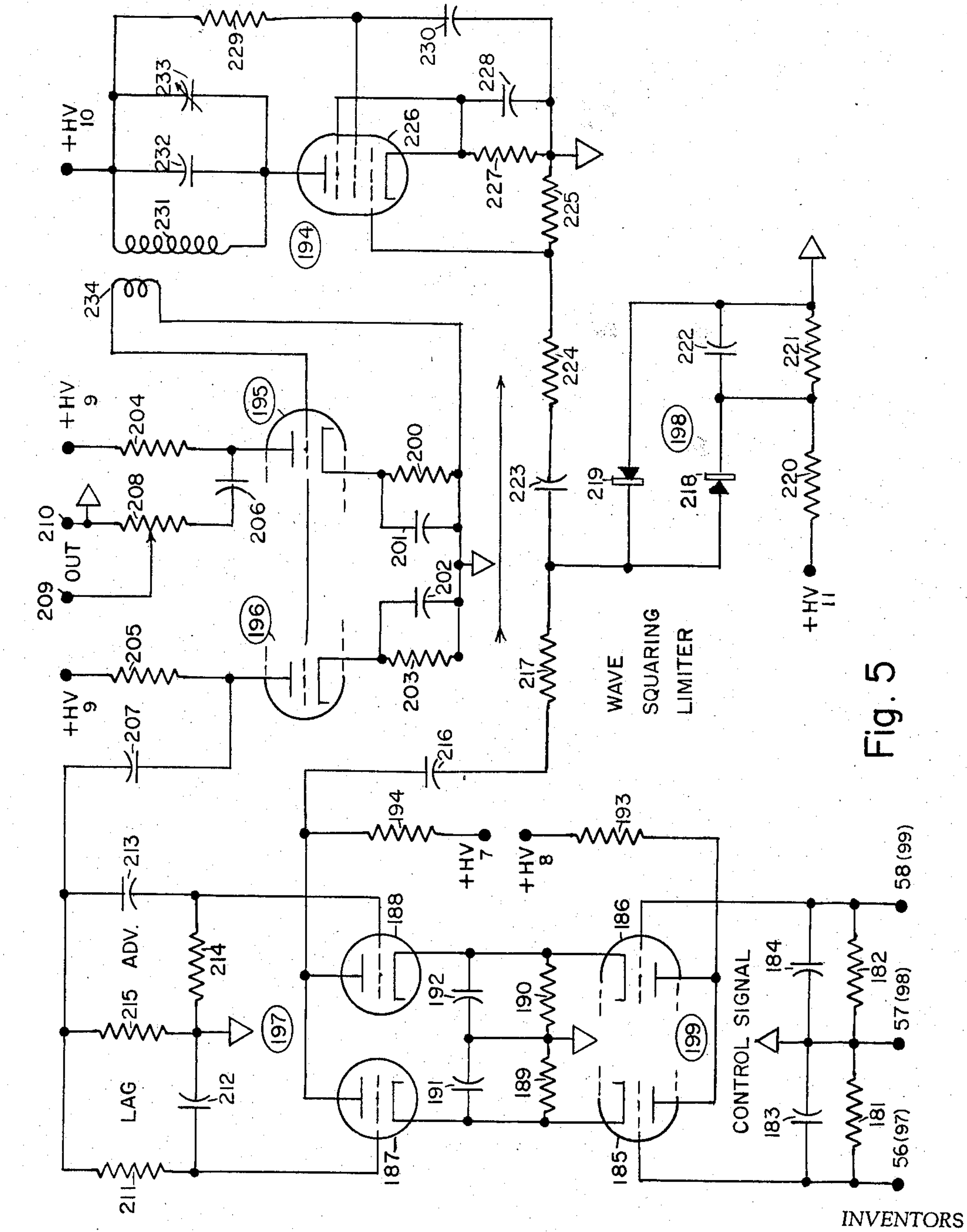
FIG. 5 is a schematic circuit diagram showing one form of a heterodyne oscillator, arranged to be controlled as to phase-frequency by the balance error voltage.

In FIG. 5 is shown one method of construction of a heterodyne of high quality for use as block 54 of FIG. 2. The general arrangement is that disclosed in U.S. Patent 2,794,124 of May 28, 1957, to E. S. Purington, but with the added feature that the phase part of the transfer function of an active part of the feedback loop is dependent upon the value of low frequency or DC voltages impressed upon the control terminals 56 and 58. The control voltages are preferably applied in a balanced manner with the voltage of 56 to ground 57 increasing when the voltage of 58 to ground 57 is decreasing, and vice versa. In the present setting, the terminals 56, 57, and 58 are connected to lines 97, 98 and 99, in the order shown in FIG. 2.

In the phase modulator 197, 199 of FIG. 5 terminals 56 and 58 are connected to ground through resistors 181 and 182, across which are capacitors 183 and 184. The connections of lines 97, 98, and 99 in FIG. 4 are such that terminals 56 and 58 are polarized slightly positively by a definite amount for the zero-error signal condition, which should be taken into account in the design of later circuits. Terminals 56 and 58 are connected to the grids of triodes 185 and 186, the cathodes of which are connected to the two cathodes of two other triodes 187 and 188. Resistors 189 and 190 from the cathodes to ground provide cathode coupling so that the cathode biases for tubes 187 and 188 vary in unison with the voltages of terminals 56 and 58. Capacitors 191 and 192 from the cathodes to ground serve to bypass AC components of heterodyne frequency carried by the triodes 187 and 188. The plates of triodes 185 and 186 are connected together and through resistor 193 to a suitable high voltage source. Since these triodes are driven substantially out of phase, the current through resistor 193 and therefore the voltage of the plates to ground is substantially constant. The plates of triodes 187 and 188 are also connected together and through a plate resistor 194 to a suitable high voltage source, but output plate voltage develops because the two grids are not driven in phase opposition but in phase quadrature.

The circuit as a whole is broadly describable as follows. System 194 is a pentode amplifier circuit in the plate circuit of which is an LC circuit of natural frequency closely corresponding to the normal frequency of oscillation of the system for zero control signals. The output of tuned amplifier system 194 feeds a buffer amplifier 195 to produce at point 209 the heterodyne output voltage, and also feeds a bufler amplifier 196 which is in a chain of tubes which ultimately supplies driving voltage for the amplifier pentode 226. System 197 is an active network the output of which can be changed in phase with respect to the input by control voltages impressed upon the triode cathodes. The output of system 197, after suitable wave shaping and attenuation, is impressed upon the input grid of the tuned pentode amplifier system 194, thereby completing the feedback chain or loop from the output of tube 194 to its input. System 198 is a two-way limiter for developing a trapezoidal or approximately square wave of definite amplitude equal to the bias between the two rectifier diodes. This square-type wave is suitably attenuated after its formation so that the amplifier system 194 operates over small swings in a Class A operation, with the fundamental of the square wave effective in producing tuned output. System 199 is for the purpose of controlling the phase shifting system 197 in accordance with the input control voltages at terminals 56 and 58.

The principal of operation is based upon the fact that a feedback oscillator oscillates, if at all, with a fundamental frequency that makes the total phase changes going around the loop an integral number of 360 electrical degrees. With a high-Q tuned output, the phase of the plate output changes very rapidly with change of frequency of the grid input for an externally driven amplifier. If now there is a circuit in the loop for which the phase portion of the transfer function is varied, with the loop closed, change of phase of this varied circuit will automatically be compensated for by an opposite change of phase in another part of the loop circuit. In the present case, the compensation occurs in the pentode amplifier system through the automatic shifting of the oscillation frequency to a slightly different value. Only by a frequency shift will the totalized phase around the loop remain unchanged. It is preferable that the tuned system be driven at its resonant frequency for the condition of zero signal, so that only a small change of amplitude occurs as the frequency is varied.

More specifically, amplifiers 195 and 196 are conventional, with cathode bias elements 200 to 203, plate resistors 204 and 205, output blocking capacitors 206 and 207, and an output tapped resistor 208 commonly called a "potentiometer" to supply a controllable amount of output between "hot" terminal 209 and ground terminal 210. The output circuit of amplifier 196 feeds a lag circuit 211 and 212 and an advancing circuit 213 and 214 to retard the phase of the voltage to the grid of triode 187 and to advance the phase of the voltage to the grid of triode 188. Resistor 215 provides for completing a conductive path from the grid of tube 187 to ground. These triodes 187 and 188 are mixers with a common plate output voltage of phase normally 180° different from the mean of the phases of the two grid voltages. This phase relation is changed when the control signal operates to cause differential cathode bias causing one amplifier chosen to operate better than the other. If the elements 211 to 215 are chosen for 45 degree advance and 45 degree lag, then it is practicable to control the phase relation of input to output over more than sufficient range. Since the capacitors in the phase lag and advance circuit produce a capacitive load on the output of the buffer amplifier 196, it is desirable that the value of capacitor 207 be properly chosen to make substantially 180° phase shift from the output of the buffer 196 to the output of controllable phase shifter 197, for the condition of zero error signal. The output of system 197 is coupled through capacitor 216 and resistor 217 to the anode of a diode 218 and to the cathode of diode 219. The anode of 219 is connected to ground and the cathode of 218 is biased positively with respect to ground by use of resistors 220 and 221 in series from a suitable high voltage source to ground, the junction of which resistors is connected to the cathode of diode 218. A capacitor 222 is connected across resistor 221. This circuit 198 operates as a wave-squaring limiter providing a wave form the fundamental of which is highly independent of the amount of sine wave impressed signal in the range of operation. This squared wave is impressed through capacitor 223 and attenuating resistors 224 and 225 to ground, connected to attenuate the signal. The junction of the resistors 224 and 225 is connected to the first grid of pentode 226, the cathode of which is biased by use of elements 227 and 228, and the second or screen grid of which is properly positively biased by resistor 229 from a high voltage point to the second grid. Capacitor 230 from the second grid to ground holds the bias steady during operation. The plate of the pentode 226 is connected through inductor 231, paralleled by main tuning capacitor 232 and vernier tuning capacitor 233 used for manual or semiautomatic control of the free running oscillation frequency of the system for zero control signal. The inductor 231 is coupled by a coil 234 to the grid-ground input of the buffer amplifiers 195 and 196. The winding of coupling coil 234 should be in such a manner that the phase of the oscillation voltage applied to the grid of pentode 226 is substantially 180° out of phase with the voltage of the plate of the pentode. That is, the elements of the circuits should be such that at the desired frequency of oscillation corresponding to the natural frequency of the tuned circuit 231, 232, 233, the loop phase changes should be correct. In the present case, there should be 180° change of phase from the output plate of the pentode 226 to the grids of the buffer amplifiers 195 and 196, and 180° phase reversals from grid to plate for the three systems 196, 197 and 194, making a total of four reversals of phase throughout the entire loop. This is of course for zero control signal. When the phase shift through system 197 is altered by a control signal operating through system 199, then since the phase change from system 194 to 197 is substantially unchanged, a compensating shift of phase occurs within the system 194, necessitating a change of the oscillation frequency. Thus by a control of error signal which changes the phase properties of one path of the loop, the frequency of the oscillation within the loop is correspondingly altered. When the system itself is a part of a loop chain, as in the present application, the effect of the control signal upon the frequency of oscillation must act to reduce the amount of the control or error signal.

Although only a few of the various forms in which this invention may be embodied have been shown herein, it is to be understood that the invention is not limited to any specific construction but may be embodied in various forms without departing from the spirit of the invention.

What is claimed is:

1. In a receiver for a continuous wave signalling system wherein signalling is effected by phase shift of a continuous wave carrier, a pair of local oscillators operating respectively above and below the frequency of the received carrier, means producing a beat note between each of said oscillators and said carrier, means deriving the second harmonic of each of said beat notes, means comparing said harmonics to derive therefrom an error signal corresponding to any variation in phase between said harmonics, and means responsive to said error signal to vary the phase of one of said oscillators in a sense to reduce the value of said error signal.

2. A receiver, as set forth in claim 1, in which said comparing means comprises a pair of channels wherein the respective harmonics are maintained in phase quadrature and means responsive to variations from said quadrature relationship is provided for producing said error signal.

3. A receiver, as set forth in claim 1, in which said comparing means comprises a pair of channels wherein said harmonics are maintained in phase quadrature and means is provided for determining both the sum and the difference of the voltages in said channels and for comparing said sum and difference voltages to derive therefrom said error signal.

4. A receiver for interrupted continuous wave reception having frequency and phase sensitivity, comprising circuit means tuned to respond to a carrier wave of a predetermined frequency, means producing a pair of local oscillations having frequencies respectively above and below the frequency of said carrier wave and differing therefrom by the same amount, a pair of circuit channels having means modulating said carrier wave with said local oscillations to produce therefrom a pair of beat frequency voltages of the same frequency but having a phase relationship dependent upon the phasing of said carrier, said last voltages being in phase for a predetermined phasing of said carrier and in opposite phase when the phase of said carrier is shifted by 90°, means in the respective channels to derive the second harmonics of said beat frequency voltages, said second harmonics being in phase for both the 0 and the 90° phasing of said carrier and being in phase quadrature for a 45° phasing of said carrier, and means responsive to a deviation of said harmonic voltages from a predetermined phase relationship to vary the phase of one of said local oscillations in a sense to restore said predetermined phase relationship.

5. A receiver for interrupted continuous wave reception having frequency and phase sensitivity, comprising circuit means tuned to respond to a carrier wave of a predetermined frequency, means producing a pair of local oscillations having frequencies respectively above and below the frequency of said carrier wave and differing therefrom by the same amount, a pair of circuit channels having means modulating said carrier wave with said local oscillations to produce therefrom a pair of beat frequency voltages of the same frequency but having a phase relationship dependent upon the phasing of said carrier, said last voltage being in phase for a predetermined phasing of said carrier and in opposite phase when the phase of said carrier is shifted by 90°, means in the respective channels to derive the second harmonics of said beat frequency voltages, said second harmonics being in phase for both the 0 and the 90° phasing of said carrier and being in phase quadrature for a 45° phasing of said carrier, phase changing means in the respective channels connected to advance the phase of one of said voltages by 45° and to retard the phase of the other of said voltages by the same amount so as to produce a pair of voltages which are in phase quadrature for said 0 and 90° phase positions of said carrier, circuit means connected to combine said last voltages in a sense to obtain sum and difference voltages which are equal when said combined voltages are in phase quadrature but differ when said combined voltages vary from quadrature relationship, means comparing said sum and difference voltages to derive therefrom a control voltage which is 0 when said last voltages are equal, and means responsive to said control voltage connected to alter the frequency of one of said local oscillations in a sense to maintain said control voltage at 0 value, whereby said oscillations remain locked in proper phase relationship to said carrier regardless of a 90° phase shift in said carrier.

6. A receiver as set forth in claim 5 having a local oscillator connected to produce one of said local oscillations and having a control circuit including a voltage sensitive element adapted to vary the frequency of oscillation in accordance with an applied voltage, said control voltage being connected to apply a voltage to said last element for thereby controlling the frequency of the oscillations produced by said local oscillator.

References Cited

UNITED STATES PATENTS

| | | | |
|---|---|---|---|
| 1,357,199 | 10/1920 | Hay | 178—67 |
| 1,559,642 | 11/1925 | Nyquist | 178—67 |
| 2,616,969 | 11/1952 | Maki | 178—88 |
| 2,954,436 | 9/1960 | Maniere et al. | 178—88 |

ROBERT L. GRIFFIN, *Primary Examiner.*

NEWTON N. LOVEWELL, *Examiner.*

A. J. DUNN, J. T. STRATMAN, *Assistant Examiners.*